Patented Apr. 6, 1943

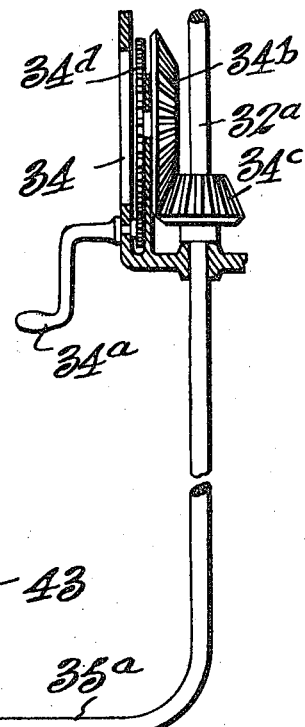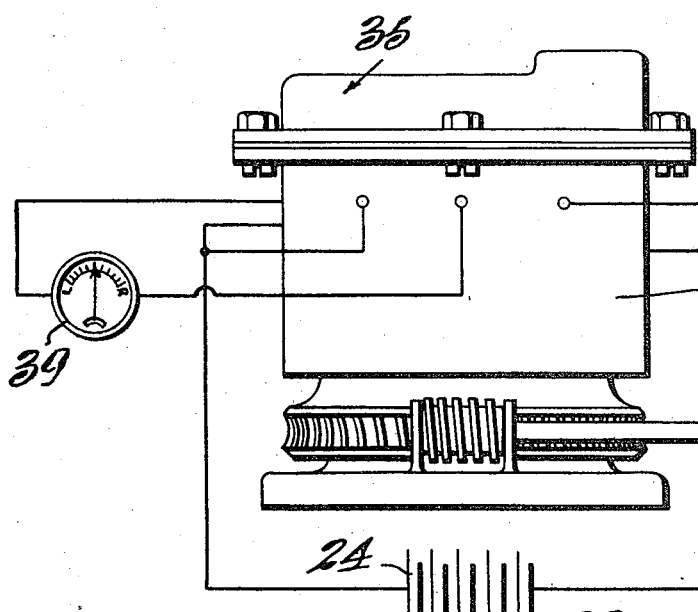
Fig. 2.
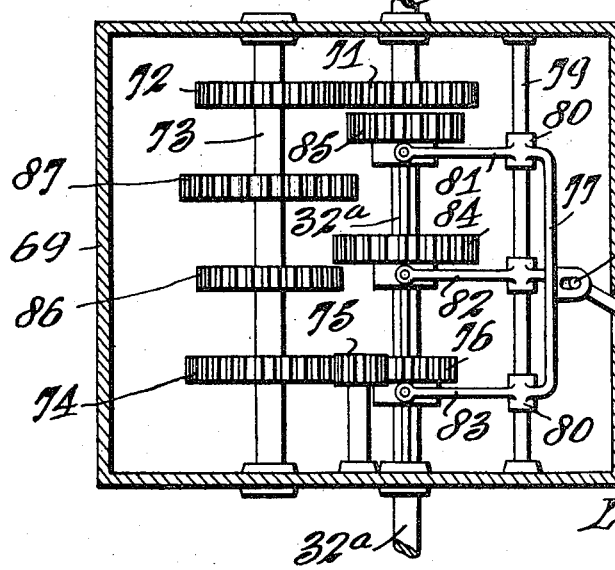
Fig. 3.
Inventor
Louis A. Warner.

2,315,754

UNITED STATES PATENT OFFICE 2,315,754

RADIO NAVIGATOR

Louis Allen Warner, Baltimore, Md.

Application June 19, 1939, Serial No. 279,986

14 Claims. (Cl. 172—282)

This invention relates to radio controlled automatic pilots for aircraft, watercraft and like vessels, in general. More particularly this invention relates to navigating apparatus in which an automatic radio compass and a magnetic or gyroscopic compass are so coupled that the radio compass is made to perform functions normally assigned to a navigating agency.

An object of this invention is to provide a navigating apparatus employing a radio compass and a magnetic or gyroscopic compass coupled thereto, said compasses being arranged so that the course selection for the mobile craft and the rudder control thereof are two separate functions.

Another object of this invention is to provide an automatic pilot apparatus for mobile craft adapted to correct for yaw.

A further object of this invention is to provide an automatic radio compass with means whereby said compass is adapted to be used as a navigator, for orientation, drift correction and for homing.

Still another object of this invention is to provide an automatic pilot for mobile craft in which course selecting apparatus is employed but in which the automatic pilot does not function until after the course is selected.

Still a further object of this invention is to provide an automatic pilot in which the navigating functions of the automatic radio compass are arrested or cut out during simple yaw of the craft.

Another object of this invention is to provide a navigating apparatus employing a radio compass in which the crab angle is selected simultaneously as the radio compass loop is rotated after the null reception position of the loop is disturbed by drift of the craft.

Still another object of this invention is to provide a navigating apparatus for mobile craft in which a radio compass is coupled with a magnetic or gyroscopic compass, said coupling consisting of a gear set whereby the navigating apparatus may be employed in four distinct types of navigation, that is, homing, orientation, automatic drift correction using radio transmitting station ahead and automatic drift correction using radio transmitting station astern.

Other and further objects of this invention will be apparent to those skilled in the art to which it relates from the following specification and claims.

Figure 1:
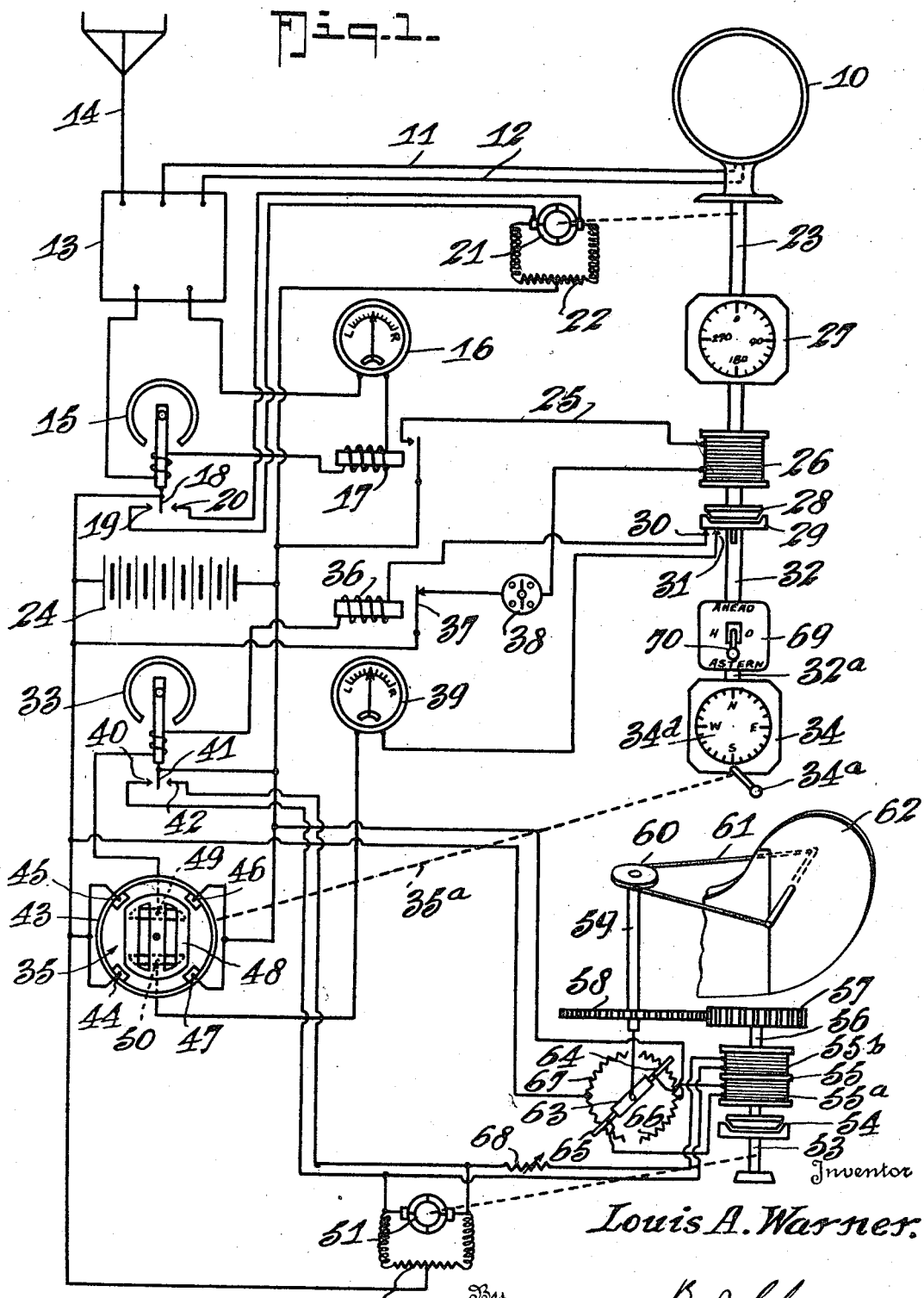
Figure 4:
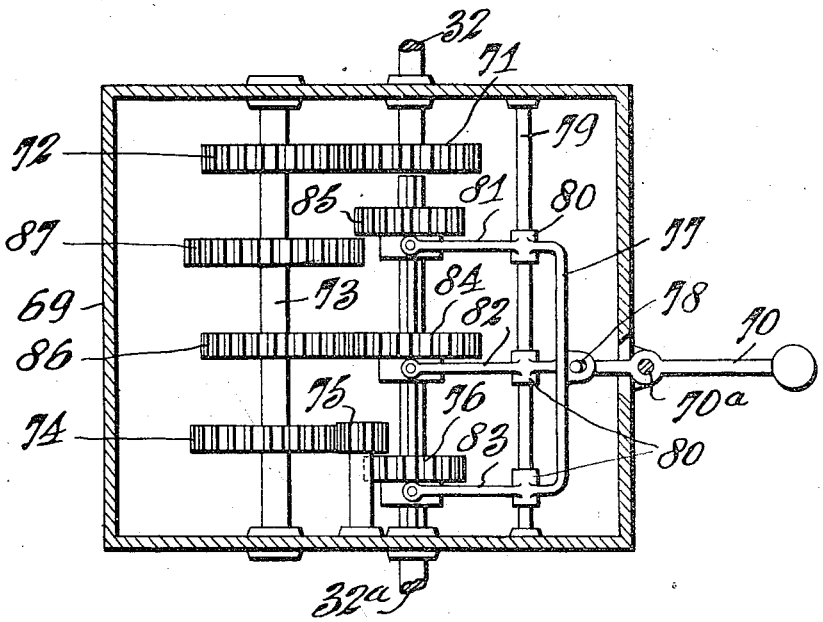
Figure 5:
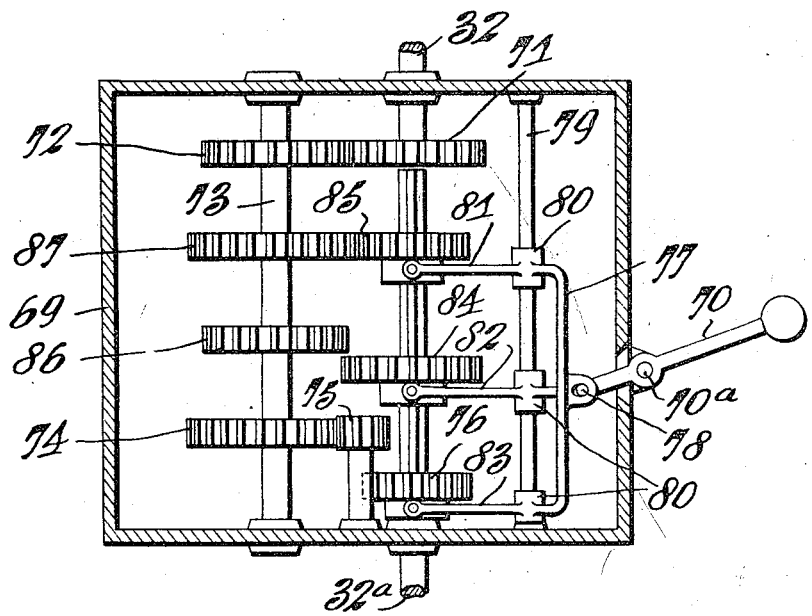

Referring to the drawing briefly, Fig. 1 is a schematic diagram showing the electrical connections of this apparatus; Fig. 2 is a view of the magnetic compass and illustrates the connection between this and the gear shaft and Figs. 3, 4 and 5 are detail views of the gear set.

Referring to the drawing in detail, reference numeral 10 designates a loop antenna connected by wires 11 and 12 to the input of a radio signal receiver and amplifier 13. The receiver and amplifier 13 is also connected to a substantially non-directional antenna 14 and the signal energy received from both the loop 10 and antenna 14 are mixed in certain desired phase relation to produce directional signal reception. For this purpose the circuit arrangement employed in the apparatus 13 may be of the type described in Patent No. 2,144,309 issued to C. W. Hicks in which a directional antenna or loop and a non-directional antenna are connected to a radio signal receiver and amplifier for the purpose of obtaining directional reception. It is of course obvious that I may employ other circuits than the aforesaid Hicks circuit for properly phasing the signal currents and potentials derived from the loop antenna and the non-directional antenna since various forms of these circuits are well known in the art as exemplified by my prior Patent No. 2,051,974 and I therefore do not desire to restrict myself to any one particular circuit since various circuits may have advantages depending upon the circumstances surrounding the use thereof.

The output of the radio receiver and amplifier is connected to the winding of the polarized relay 15, the radio null indicating instrument 16 and the relay 17. The instrument 16 is provided with a pointer actuated by a d'Arsonval or similar electromagnetic meter movement polarized to indicate when the craft is bearing to the left or the right of the radio course. The relay 17 is shown as an auxiliary instrument although it could be incorporated into the relay 15 by providing another pair of contacts one on each side of the armature 15 substantially the same as the contacts 19 and 20. These two additional contacts would be connected together and to the wire 25 to close the circuit of the solenoid 26 the same as when the relay 17 is energized.

When the armature 18 of the polarized relay 15 is deflected toward the contact 19, that is, when the craft drifts to the left, for example, the loop rotating motor 21, is energized from the source of current supply, such as, the battery 24 through the resistance 22. This motor being geared to the loop rotating shaft 23 causes the loop to be rotated in one direction when energized through the circuit of relay contact 19 and in the other direction when energized through the circuit of relay contact 20. Thus the loop is rotated to seek the null signal point at which the relay 15 is substantially not energized through the action of signal energy. A resistance 22 is connected between the field windings of the series-compound motor 21 to act as a braking device to reduce rotation of the motor armature because of inertia thereof, after the motor is de-energized.

A radio azimuth indicator 27 is also provided to the shaft 23 to indicate the azimuth of the loop antenna which is usually positioned on the outside of the aircraft or watercraft cabin out of the operators', pilots' or navigators' view. On aircraft the loop antenna is often enclosed in a tear drop shaped housing to decrease wind resistance and the loop is rotatable inside of this housing out of sight so that it is necessary to employ a loop azimuth indicator. Furthermore it may appear from the drawing that the shaft 23 is a rigid member and it is of course apparent that flexible shafting similar to the Bowden type may be employed.

When the clutch operating solenoid 26 is energized from the current source 24 through the operation of the relay 17 the clutch members 28 and 29 are caused to engage through the magnetic action of the solenoid and the shaft 32 is linked to the shaft 23 whereby these shafts are rotated together by the motor 21. At the same time as the clutch members 28 and 29 are brought together the contacts 30 and 31 are interrupted so that the circuit of the rudder control relay is open at these contacts while the radio loop and the course selector compass 34, 35 are being adjusted through the operation of the motor 21. The purpose of this will be more fully brought out in following paragraphs of this specification.

The winding of the relay 36 is connected to the contact 30 and to the winding of the polarized relay 33 which in turn is connected to an electrode 49 of the electrolytic resistance device 35. The device 35 is constructed in accordance with the disclosure of Patent No. 1,932,329 of Urfer although it is of course obvious that similar devices employing wiping contact resistance elements instead of electrolytic conducting paths may be employed if desired. Another electrode 50 similar to electrode 49 is provided to the device 35 and is connected to the yaw indicator 39 which in turn is connected to the contact 31. The yaw indicator 39 is a meter similar to the radio null indicator 16.

The electrolytic device 35 consists of a container 43 preferably of insulating material, supporting contacts 44, 45, 46 and 47 in an electrolyte. The electrodes 49 and 50 are supported in the electrolyte on suitable supports. An insulation member 48 is pivotally supported in said electrolyte and is provided with suitable magnets to adjust the position of the insulation member 48 with respect to the earth's magnetic field so that portions of this insulation member may be interposed between certain electrodes of the device 35 and the electrical resistance of the current paths of the device varied in the course selecting operation.

It will be observed that electrodes 44 and 45 are connected together to one terminal of the battery 24 and the electrodes 46 and 47 are connected together to the other terminal of this battery. The current flow through the device 35 will therefore flow between the electrodes 44, 50 and 47 on one side and electrodes 45, 49 and 46 on the other side with the insulation member 48 in the position illustrated. If the insulation member 48 is shifted so that the path through the electrolyte is increased between the electrodes 44 and 50 and between electrodes 46 and 49 on the one hand, the path through the electrolyte between electrodes 45 and 49 and electrodes 47 and 50 is reduced on the other hand so that current flows between the electrodes 45 and 49 through the winding of the polarized relay 33, the relay 36, contacts 30 and 31, yaw indicator 39 and electrodes 47, 50 to the other terminal of the battery 24 to complete the circuit. If the insulation member 48 is turned or shifted in the other direction the current flows in the opposite direction and produces an opposite indication in the yaw indicator 39. The polarized relay 33 may be deflected in either direction so that the armature 41 engages either contact 40 or 42 depending upon the direction of current flow through the winding of this relay as determined by the compass device 35.

The armature 41 of the relay 33 is connected to one terminal of the battery 24 for the purpose of energizing the motor 51 through the contacts 40, 42 when the relay is energized. Both of the contacts 40, 42 are connected to the motor 51 so that this motor may be rotated either clockwise or counterclockwise depending upon the energization of the polarized relay 33. The motor 51 is also of the series compound type similar to the motor 21 and is also provided with a braking resistance 52 which is connected to the battery 24 to complete the energizing circuit of the motor. A mechanical connection is provided between the motor 51 and the shaft 53 which is coupled through the electromagnetically controlled clutch 54 to the shaft 56. Suitable gear wheels 57 and 58 are employed for driving the rudder actuating shaft 59 from the shaft 56. The rudder 62 is connected by the rope 61 or other suitable means to the wheel 60 mounted on the shaft 59.

The variable resistance device including the resistances 66 and 67 is arranged to be controlled in accordance with the rotation or angular movement of the shaft 59 by coupling the contact arms 64 and 65, joined together by a piece of insulation material, to the aforesaid shaft. The contact arms 64 and 65 are connected to the terminals of one of the windings 55a of the clutch solenoid 55 and the resistances 66 and 67 are connected to the terminals of the battery 24 respectively, whereby the solenoid winding is energized to an extent depending upon the positions of the contact arms. The other winding 55b of the solenoid 55 is connected across the brushes of the motor 51.

Thus the winding 55b is always energized in series with the motor 51 and the direction of current flow through this winding depends upon which of the contacts 40 or 42 of the polarized relay 33 is in circuit. A variable resistance 68 is connected in series with the winding 55b so that the energization of this winding may be controlled by the operator if desired. The lower winding 55a of the clutch is employed for the purpose of knocking down the clutch element 53 to prevent overcontrol of the rudder. When this winding is energized the current flowing through it flows in a direction opposite to that in the upper winding 55b. Since the winding 55a is energized through the resistances 66—67 which are varied in accordance with the position of the rudder shaft 59 this winding will be energized in a definite direction and in a definite amount. When however the arms 64 and 65 are contacting the points of the resistances 66 and 67, respectively connected to the terminals of the battery 24 the winding 55a is being fully energized with very little of the resistances 66 and 67 in circuit. As was mentioned above the purpose of the winding 55a is to magnetically bias the clutch and knock it down to prevent over control when the craft is nearing its "on course" position and it will be observed that as the craft is approaching "on course" position this winding approaches maximum energization so that it is then able to overcome the magnetic effect of the winding 55b. The clutch 54 must release before the craft is "on course" because otherwise the craft would swing far past its "on course" position and this is accomplished by the winding 55a.

The gear set 69 which is illustrated in detail in Figs. 3, 4 and 5 is connected between the clutch plate 29 and the compass course selector 34 to the shafts 32 and 32a. The gear set is provided with a gear shift lever 70 which has three positions, namely, "ahead," "homing" and "astern." When the lever 70 is in its "ahead" position the apparatus is adapted to be used in connection with a radio transmitting station located ahead of the craft being navigated. When the lever 70 is in its "astern" position the apparatus is adapted to be used with a radio transmitting station located in back of or astern of the craft being navigated and when the lever 70 is in its "homing" position the apparatus is adapted to be used for homing purposes.

The gear set 69 is provided with a gear 71 attached to the shaft 32 and meshing with another gear 72 mounted on the shaft 73. The gears 71 and 72 have a one to one ratio. Another gear 74 is also mounted on the shaft 73 and meshes with a reversing idler gear 75 which in turn drives the gear 76 mounted on the course selector shaft 32a when the gear shift lever 70 is in its "astern" position shown in Fig. 3. The gear 76 is one-half the diameter of the gear 74 and is therefore rotated twice the number of revolutions as the gear 74 and in the same direction inasmuch as the reversing gear 75 is interposed between the gears 74 and 76. Thus in the "astern" position the shaft 32a is rotated in opposite direction to the shaft 32 and at twice the angular velocity.

The lever 70 is pivotally mounted on the housing of the gear set by the pivot 70a. On the inside of the gear housing is provided a slidable gear shifting member 77 which is pivoted to the lever 70 at 78 and is supported by the bar 79 passing through sliding collars 80 of the member 77. Three sliding gear forks 81, 82 and 83 are employed by the member 77 for shifting the positions of the gears 76, 84 and 85 mounted on the splined shaft 32a. It will be observed that when the lever 70 is in the "astern" position that the gear 76 meshes with the gear 75 as explained above and that gears 84 and 85 are idling.

When the lever 70 is shifted to the "homing" position shown in Fig. 4 the gear 76 is caused to disengage the idler gear 75 and the gear 84 is slid into mesh with the gear 86. The gears 84 and 86 bear a one to one ratio to each other and consequently when these gears mesh the course selector shaft and the shaft 32 rotate in the same direction and at the same angular velocity. When the lever 70 is shifted to its "ahead" position as shown in Fig. 5 the gears 84 and 86 are caused to disengage and the gears 75 and 76 are left disengaged while the gears 85 and 87 are brought into mesh. These gears 85 and 87 bear a one to two ratio, that is, the gear 85 is one-half the diameter of the gear 87 and consequently rotate the shaft 32a of the course selector through twice the angle through which the shaft 32 is rotated. In this case the shafts 32 and 32a rotate in the same direction.

In Fig. 2 I have shown a detail view of the mechanical connection 35a between the electrolytic resistance compass device 35 and the shaft 32a. Both of these shafts 32a and 35a are rotatable by the manual crank 34a through the bevel gears 34b and 34c so that the compass device 35 may be set on a certain course indicated by the compass card 34d which is rotated simultaneously therewith by the crank 34a during manual adjustment or by the shaft 32a during adjustment by radio.

The operation of the apparatus of my invention may be best understood when it is considered from the standpoint of each of its several functions. The radio compass as employed in accordance with this invention indicates drift not only electrically but also as an azimuth reading It further is made to select through the previously described gear coupling, crab angle course that correct the drifting tendency and for tha purpose can use radio transmitting stations both ahead and astern. Another navigational feature is that the radio compass initially orient the aircraft on to its course towards its destination and, using stations ahead it may be use automatically to select a homing path. Furthermore the apparatus of my invention is also useft in blind landing systems as will be apparent fror this specification.

To correct for drift the loop rotation of th automatic radio compass is utilized to mechani cally rotate a course selector 34—35 through clutching and gear arrangement including th clutch 28—29 and gear set 69 at a ratio of mor than one to one, that is, with the gear lever 7 set either in its "ahead" or "astern" position The aircraft or other vessel being navigated thereby headed into the wind at a crab ang] which counteracts drifting. This is accomplishe as follows: Drift along the lateral axis of th craft occasioned by winds will destroy the equ: librium in the null seeking loop 19. The voltag( then induced into the loop are combined wit those induced into the sense antenna 14 in radio receiver 13 which through phasing an amplifying arrangements operates to produce a indication in a zero center meter 16 and to actu ate the polarized relay 15. The loop control re lay 15 then functions to supply current in th proper direction to the loop rotator compoun wound motor 21 which rotates the loop in a d rection to restore it to the null position with re spect to the radio transmitting station. Whe the null position is regained the armature of th relay 15 is restored to normal position and cui rent no longer flows to the loop rotator motc 21. The resistance 22 connected across the motc armature through the field windings functions $ an electrodynamic brake to bring the motor to quick stop. During the aforesaid null seekir period the loop azimuth indicator 27 was al: rotated and indicates the direction and angle ( loop swing. While the radio compass functione as described above the following drift correctir operation took place. Simultaneously with th operation of the relay 15 through the operatic of the radio compass, the clutch relay 17 ope to supply current to the clutch solenoid 26 h closed the clutch plates 28—29 and cou- the loop shaft 23 to the course selector shaft The cone clutching plate 29 is so constructed it turns with the course selector shaft 32 it is simultaneously movable longitudinally he splined end thereof. This transmits the rotating torque on to the gear set 69 wherein gearing arrangement integrates this rotation at the course selector shaft 32a is rotated ratio of more than one to one. It is im- ant to note that during this process of course tion into the wind the rudder control mech- n is opened at the clutch contacts 30—31 prevents swinging of the craft itself while crab angle course is being selected. When oop regains its null position, the course se- on has been accomplished, and the relay 17 -energized so that the clutch winding 26 is de-energized and the clutch armature 29 s thereby closing the contacts 30—31 which the rudder control circuits that function to y the craft about to its new crab angle head- Briefly then the automatic radio compass selects the drift correcting course and at the oletion of that task it allows the magnetic pass control element to swing the craft onto course. Thus the course selection and the er control are two separate functions or op- ons. The separation of these two functions itally essential for practical navigational ons as will become apparent from the wing.
uring the time that the craft is being swung nd onto its new crab angle course the loop a physical part of the craft will turn with id will bring into play the null restoring ac- of the automatic radio compass system and rotate the loop in a direction opposite to that hich the plane itself is turning. It is evident the loop rotating action to restore its align- t on bearing must not at this time affect the se selector in any way. The clutch cut off re- 36 functions to separate the loop rotating t from the course selecting shaft during this swing of the loop. It operates just as soon as course selection function has been complet- nd the clutch has been released. The clos- of the contacts 30—31 closes the circuit for relay 36 along with the relay 33. This opens break contact 37 of the relay 36 and opens circuit to the clutch winding 26, keeping it until the craft has reached its new "on se" heading when the relay 36 releases at the of a course correcting cycle. Should more be encountered the same cycle of events will at themselves.
us far drift or movement along the lateral of the craft have been considered and now effects of yaw or simple rotation about the 's vertical axis occasioned by local turbulence be considered. Yaw will likewise affect the equilibrium in the loop and will actuate the matic radio compass. The loop will rotate tly during yaw but this cannot be allowed to t the course selector. The correction for is never more than a one to one ratio of turn. therefore very evident that a more than one ne correction that is incorporated into the correcting features must not be used for correction. The mechanical separation at clutch of the two shafts 23 and 32 simpli- lelegation of the jaw correcting action to the matic pilot controlled either by the magnetic yroscopic compass elements. The fast operating relay 36 effectively separates the loop ro- tator shaft 23 from the course selector shaft 32 at the clutch 28—29 by opening the circuit at 37 to the clutch winding 26 during a yaw or turning condition. A turn around the vertical axis dis- turbs the equilibrium in the directive element in the compass resistance 35 and current flows through the rudder control relay 33, the relay 36 and the yaw indicator simultaneously. The relay 36 quickly acts to open the clutch circuit at its break contact and prevents the clutch from oper- ating during simple yaw.

The directive element in the compass appa- ratus 35 is fundamentally part of a Wheatstone bridge circuit with electrolytic resistances in the branches. Current is fed to the bridge through four points substantially equally spaced around the shell 43 thereof. Yaw indicator and control circuits are connected to electrodes 49 and 50 sup- ported in the electrolyte of this compass appa- ratus. Yawing disturbs the bridge circuit bal- ance and current flows in the control and indi- cating circuits in a direction dependent on the direction of turning. This operates the relay 33 in such manner that the rudder control motor 51 functions to bring the craft back to its cor- rect course thereby restoring balance in the bridge circuit. A rotation of the shell 48 of the compass apparatus 35 manually by the crank 34a or by the loop rotating torque in effect changes the course since it also disturbs the bridge cir- cuit balance and requires rotation of the craft in a proper direction to restore the balance.

The gear set 69 is an essential part of this sys- tem since it enables an integration of the loop rotating action into four distinct navigational functions, namely, homing, orientation, automa- tic drift correction using radio station ahead of the craft and automatic drift correction using radio station astern. For homing, rotation of the clutch shaft 32 is transmitted to the course se- lector shaft 32a through the gear arrangement 69 at a ratio of one to one and in the same direction. For orientation the same gear arrangement 69 is used at the outset of a flight to automatically select the initial course towards the destination point. For automatic drift correction using a radio station ahead the rotation of the clutch shaft 32 is transmitted to the course selector shaft 32a through the gear arrangement 69 at a ratio of more than one to one and in the same direction. This in effect picks a course into the wind to counteract the drifting tendency. For automatic drift correction using a radio station astern the rotation of the clutch shaft 32a through the gear arrangement 69 at a ratio of more than one to one preferably two to one in an opposite direction. A course into the wind is like- wise selected and drift corrected. Thus if a wind condition from the left producing drift to the right is assumed, with the gear shift lever 70 in the "ahead" position, the loop rotation to the left to regain the null position will be transmitted through the gear set 69 to the upper sliding gear 85 which is half the diameter of its meshing gear 87 and will rotate the course selector shaft 32a through substantially twice the angle and in the same direction as the clutch shaft. Under the same condition of drift with the gear shift lever 70 in the "astern" position the loop rotation this time to the right will be transmitted through the gear set to the lower sliding gear 76 which is half the diameter of its driving gear 74 and reverses the direction of rotation without affecting the gear ratio. The use of astern bearings is unique in that it offers drift corrected navigation away from a station towards a point at which there is no radio station.

The clutch switch 38 manually breaks the link between the automatic radio compass and the automatic pilot allowing each to be used separately. It permits magnetic compass navigation during periods of poor radio reception or when the automatic radio compass is being utilized for position finding and bearing taking purposes. This switch is likewise used to open the clutch circuit when shifting gears on the gear set 69 and prevents a loop rotating action from damaging gears while changeover is taking place.

I have described the various features of my invention in detail, however, I do not desire to limit this invention to the exact details set forth in the foregoing specification except insofar as such details may be defined in the claims.

What I claim is as follows:

1. A radio navigational control, comprising a rotatable directional antenna system adapted to be carried by a vehicle, means for controlling the rotation of said antenna system for maintaining said system pointing in a predetermined direction with respect to a selected radio transmitting station, a crab angle indicator, and means for rotating said crab angle indicator in a direction opposite that of the antenna rotation and through an angle substantially greater than the angle through which the antenna is rotated, for indicating the crab angle of said vehicle, when using a radio transmitting station astern of the craft for navigational reference.

2. A radio controlled automatic pilot, comprising a rotatable directional antenna system, means by which said antenna system may be maintained oriented with respect to a point used for navigational reference, a course changing device, means for coupling the rotary action incident to such antenna orientation to said course changing device, means in said last mentioned means for rotating said course changing device in a direction opposite that of the antenna at a ratio of substantially more than one to one when using a station from behind the craft for navigational reference, means whereby said change of position of said course changing device controls the steering of the craft automatically, to navigate the craft along a crab angle course, and to effect a straight track with respect to the ground.

3. A radio navigational control system, comprising: a rotatable antenna system, a rotatable shaft for said antenna system, automatic means for rotating said antenna system to point in a predetermined direction, automatic steering means including a course selector, a rotatable shaft for said selector, means for utilizing this rotary action to revolve said course selector shaft, a clutch interposed between the antenna shaft and the course selector shaft, said clutch being maintained in an inoperative condition by associated electrical circuits in said automatic steering means to prevent rotation of said course selector through said course selector shaft by said antenna shaft during period that yawing is taking place, delegating the function of yaw correction to the automatic steering means controlled by the magnetic or gyroscopic directive element.

4. A radio navigational control system comprising: a rotatable antenna system, a rotatable shaft for said antenna system, automatic means for rotating said antenna system to point in a predetermined direction, a course selecting device, a shaft for adjusting said course selecting device, means for utilizing the antenna rotating action to revolve said course selecting device, automatic means for steering the craft in accordance with the position of the said course selector device and its associated magnetic or gyroscopic directive element, a clutch interposed between said antenna shaft and said course selector shaft for the purpose of connecting the two shafts, means for rendering the clutch in an operative condition when a new course is being selected, and break contact means connected to said clutch for disabling said automatic steering means and preventing said steering means from acting to change the heading of the craft being steered during the period that a new course is being selected, thereby assuring a full swing of both the antenna system and the course selector to achieve a course into the wind.

5. A radio navigational control system, comprising: a rotatable antenna system, a rotatable shaft for said antenna system, means for rotating said antenna system to point in a predetermined direction, a radio receiver connected to said antenna, a course selecting device, a shaft for adjusting said selecting device, means for utilizing the antenna rotating action to revolve said course selecting device, automatic means for steering the craft in accordance with the position of said course selector device, including a rudder motor and rudder turning means, electrical means for preventing overcontrol of the rudder of the craft by said steering means, comprising, a clutch interposed between said rudder motor and said rudder turning means, said clutch alternately connecting and disconnecting said rudder motor shaft and the rudder turning shaft, and comprised of two windings, one winding energized simultaneously with and in the same direction as the motor armature, the other winding energized by a variable resistance device actuated by the rudder shaft in such a manner that current through it is in an opposite direction, means functioning to release the clutch when the rudder moves off center by a definite amount, allowing the rudder to return to the midship position before the "on course" position of the craft is reached.

6. A radio navigational control system, comprising: a rotatable antenna system, means for rotating said antenna system to point in a predetermined direction, a course selecting device, a clutch and gear, means for utilizing the antenna rotating action to revolve said course selecting device through said clutch and gear, automatic means for steering the craft in accordance with the position of said course selector, a motor for operating the rudder of the craft, automatic means for preventing overcontrol of the rudder action, comprising a clutch operated by a pair of windings, one winding in shunt to the said rudder motor armature circuit, semi-circular resistances, a pair of contactors moveable thereover, a shaft connected to the craft's rudder for moving said contactors, the other winding connected to said moveable contactor arms, the energization of the two windings being controlled to release the rudder at the proper time without affecting the operation of the motor control means, the yaw indicator, or associated electrical devices.

7. A radio controlled automatic pilot, comprising: course changing means, rotative radio directional means, means responsive to the rotation of said rotative radio directional means for rotating said course changing means, automatic steering means responsive to the position of said course changing means to steer the vehicle onto and maintain a selected course, said automatic steering means including a magnetic or gyroscopic compass, means for rotating said course changing means in the same direction as the rotative radio directional means and at an angular value substantially greater than unity when using a radio station at a point ahead of the vehicle for automatic drift correcting navigation, means responsive to said magnetic or gyroscopic compass for rendering inoperative said course changing means during a condition of yaw, and automatic means for maintaining directional stability around the vertical axis by means responsive to magnetic or gyroscopic directive means.

8. A radio controlled automatic pilot, comprising: course changing means, rotative radio directional means, means responsive to the rotation of said rotative radio directional means for rotating said course selecting means, automatic steering means responsive to the position of said course selecting means to steer the craft onto and to maintain the course selected by said course selector means, said automatic steering means including a magnetic or gyroscopic compass, means for rotating said course selector in a direction opposite that of the rotative radio directional means at a ratio of more than one to one when using a radio transmitting station at a point astern of the craft for automatic drift correcting navigation, means responsive to said magnetic or gyroscopic compass for preventing the functioning of said course selector during a condition of yaw, and automatic means responsive to magnetic or gyroscopic directive means for maintaining stability around the vertical axis.

9. A system for steering moving craft along a predetermined substantially straight track under conditions of yaw and drift, comprising: a radio direction finder having a rotatable loop and means connected to the radio direction finder for rotating said loop with respect to a selected radio transmitter, a compass course selector, a gear arrangement mechanically connected between said rotatable loop and said compass course selector for setting said course selector in accordance with change in setting of said rotatable loop to compensate for effects of drift of the craft, said compass course selector being sensitive to yawing of the craft, and means connected to said compass course selector for preventing resetting of said compass course selector during yawing of the craft.

10. A radio navigator, comprising: a rotatable directional antenna having a rotatable shaft, means for maintaining said antenna oriented towards a predetermined point, a course indicating and selecting device having a rotatable shaft, means for imparting the angular movement of said antenna shaft to said course indicating and selecting device shaft, clutching means for alternatingly engaging and disengaging said two shafts, means for energizing and operating said clutch simultaneously with said antenna rotation during drift and rapidly acting electrical means for preventing the operation of said clutch during yaw and while the craft being navigated is being oriented on to its course.

11. A course navigational system for yaw and drift correction, comprising: means for detecting and correcting yawing, including means to effect course change corrections at a ratio of one to one with respect to the yaw angle, means for detecting and correcting drifting, including means to effect course change corrections at a ratio of more than one to one with respect to the drift angle, and means to differentiate between the yaw and drift corrective actions, so that the said one to one ratio correction will be applied for yaw, and the said more than one to one ratio corrections will be applied for drift.

12. A course navigational system for drift correction, comprising: means for detecting drifting, means to effect course change corrections at ratios of more than one to one with respect to the drift angle, when points ahead of the craft are used for navigational reference, means to effect course change corrections, in a reversed direction, at ratios of more than one to one with respect to the drift angle, when points behind the craft are used for navigational reference, course change controller means for controlling the directions and ratios of the said course changes, and means for indicating the position of said course change controller means.

13. The combination in a system for homing and drift correcting navigation towards a point ahead of the craft, of means for detecting drifting, means to effect course changes at ratios of one to one with respect to the drift angle, for homing navigation, means to effect course changes at ratios of more than one to one with respect to the drift angle, for drift correcting navigation, means for controlling the ratios of the said course changes, and means for indicating the position of the said course change controller means.

14. The combination in a course navigational system, of means to indicate azimuth towards a point of navigational reference, automatic means to set the initial course towards the said point, including mechanical rotational means to effect course change settings at a ratio of one to one with respect to the angle of azimuth change, means for controlling the ratio of said course change, and means for indicating the position of said course change controller means.

LOUIS ALLEN WARNER.